United States Patent [19]

Nadler et al.

[11] 3,860,770

[45] Jan. 14, 1975

[54] SYSTEM FOR STORING TONE PATTERNS FOR AUDIBLE RETRIEVAL

[75] Inventors: Bernard David Nadler, Bayside; Mitchell A. Cotter, Riverdale, both of N.Y.

[73] Assignee: APM Corporation, Englewood, N.J.

[22] Filed: Oct. 29, 1973

[21] Appl. No.: 410,430

Related U.S. Application Data

[62] Division of Ser. No. 295,234, Oct. 5, 1972, Pat. No. 3,810,106.

[52] U.S. Cl. .......................... 179/100.3 B, 84/1.02
[51] Int. Cl. .......................... G11b 7/00
[58] Field of Search .................. 84/1.02, 1.18, 1.28; 179/100.3 A, 100.3 B, 100.3 C, 1 S, 1 A; 340/173 LC, 173 LM

[56] References Cited

UNITED STATES PATENTS

| | | | |
|---|---|---|---|
| 2,347,084 | 4/1944 | Cooney | 179/100.3 A |
| 2,575,445 | 11/1951 | Germer | 179/100.3 A |
| 3,405,222 | 10/1968 | Heinzl | 84/1.18 |
| 3,624,284 | 11/1971 | Russell | 178/6.7 A |
| 3,769,468 | 10/1973 | Shutterly | 179/100.3 A |
| 3,772,465 | 11/1973 | Vlahos et al. | 178/6.7 A |

*Primary Examiner*—James W. Moffitt
*Assistant Examiner*—Stewart Levy
*Attorney, Agent, or Firm*—Charles E. Temko

[57] ABSTRACT

A system of storing information as a plurality of parallel, finite length tracks, each track constitiuting a discrete tone pattern, and means for retrieving said tone patterns by orthogonal scanning of said tracks using a single scanning device, whereby the entire field of stored information is substantially simultaneously available for reproduction. The system is particularly suited for audible retrieval, with disclosed application to voice reproduction, vocoders, and electronic keyboard instruments.

2 Claims, 13 Drawing Figures

PATENTED JAN 14 1975

3,860,770

SHEET 2 OF 7

SYSTEM FOR STORING TONE PATTERNS FOR AUDIBLE RETRIEVAL

This application is a division of application, Ser. No. 295,234, filed Oct. 5, 1972 now U.S. Pat. No. 3,810,106.

This invention relates generally to the field of data storage, and more particularly to the storage and retrieval of tone patterns for audible reproduction. While the possible uses of the invention have application in many areas, the invention has particular application to the field of reproduction of a stored spoken vocabulary, and musical instruments, such as electronic organs and similar keyboard control devices.

BRIEF DESCRIPTION OF THE PRIOR ART

In prior art devices, audible sounds are normally stored in parallel tracks upon rotating drums or other moving storage mediums, and a separate pickup or other retrieval device is used for each track. Given consideration of space and cost, most audible retrieval devices in the prior art are limited to relatively small vocabularies of the order of less than 50 words, and seldom exceed 100 words.

The storage of musical sounds has largely been confined to continuous single tracks, typified by phonograph records and tapes, and while the use of recorded sound to provide a tone source for musical instruments is not entirely unknown, prior art embodiments have been so limited with respect to response time, tone quality and available tonal range as to be lacking in serious utility.

BRIEF DESCRIPTION OF THE PRESENT INVENTION

Briefly stated, the invention contemplates the provision of a generally rectangular shaped storage record having a large plurality of recorded sound tracks of finite length arranged in parallel juxtaposed position upon the record. This record is scanned orthogonally at very high speed in raster-like fashion such that each deflection of scanning being perpendicular to the axis of the sound track crosses all of the tracks, thus potentially reading all of the information contained in the record to make the same available for retrieval over a very short period of time. Scanning is performed using a laser beam, and electro optical reproduction is performed at far greater than real time output rates. Analog retrieved signals are converted to digital values, and are rapidly stored using one or more storage registers which are then unloaded at relatively slower intervals, the retrieved signals then being again converted to analog values, suitably modified, and amplified, and transduced.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
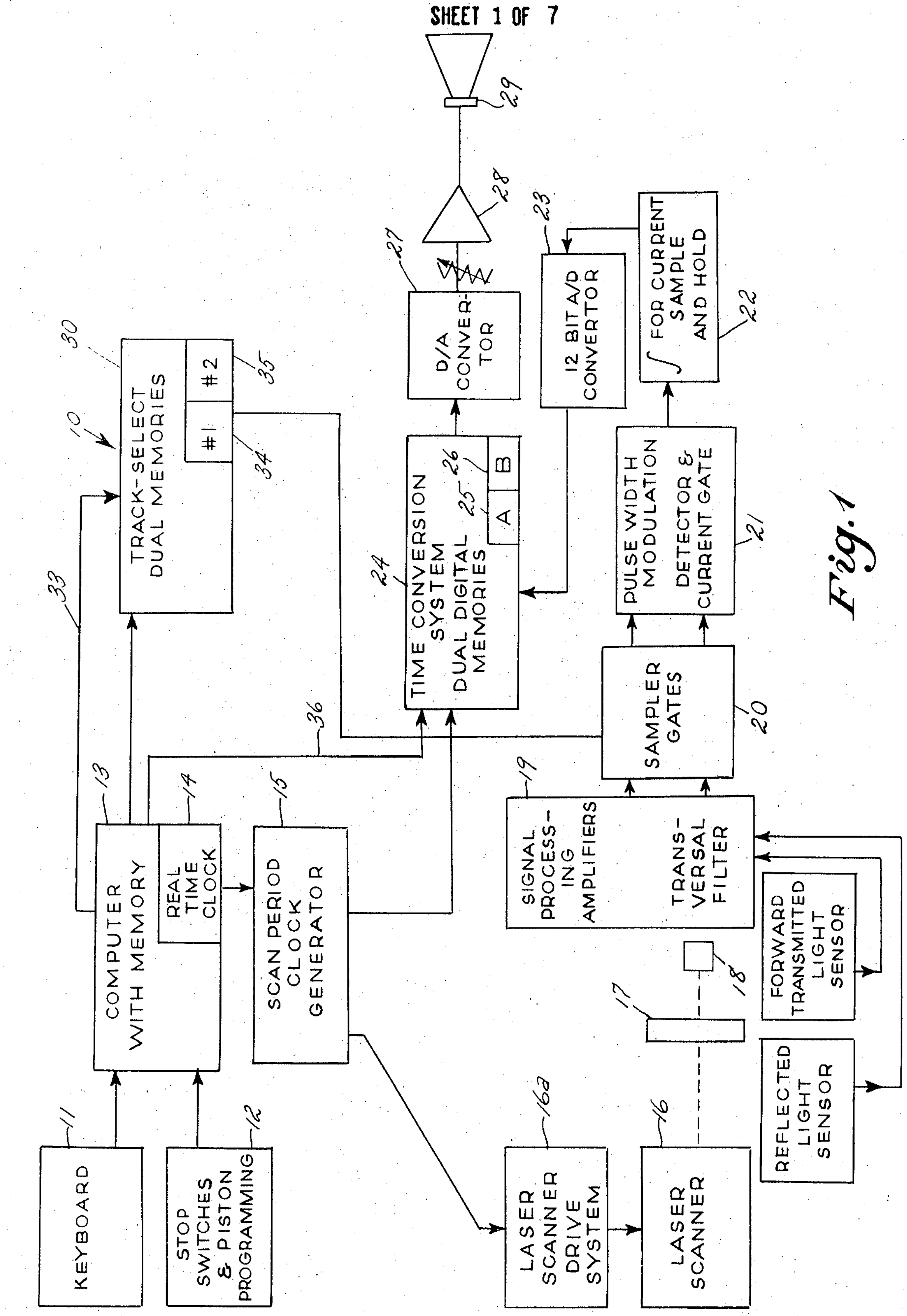
FIG. 1 is a schematic block diagram showing a first embodiment of the invention.

Before entering into a detailed consideration of the first embodiment of the invention, which relates to an electronic organ, a brief review of the state of the electronic organ art is considered apposite.

Over the past 35 years various attempts have been made to create organs suitable for institutional and home use at a cost far less than that of conventional pipe organs. The latter have always been essentially hand built, and the nature of construction of the same does not lend itself to mass production. The earliest electric organs were simple variants of the old-fashioned reed organ, in which air is circulated over reeds to produce a relatively faint tone. This tone is electrically amplified for volume and modified for vibrato and tremulo effects, but essentially the tone produced is that of the vibrating reed initially generating the tone, and thus the tonal range of such instruments is very limited.

Approximately in 1936, a second advance in the art was created by the Hammond Organ Co. in which tone generation was accomplished by providing a rotating shaft having a large plurality of tone wheels, the shaft being driven by a synchronous motor. The peripheries of the tone wheels are modified so as to permit the generation of tone at proper frequency when the shaft is rotated at a predetermined rate. This organ system provided an advantage in that vacuum tubes need only be required for amplification stages of reproduction, and while the tone produced is quite pleasing, it does not even approximate the tone of a fine pipe organ. While such instruments are in widespread use at the present time, they are suitable principally for the performance of non-classical and non-liturgical literature.

With the extended development of transistors to replace vacuum tubes, the art progressed to the use of individual circuits for each desired tonal frequency, and the quality of tone generation remarkably improved to a point where the tone obtained from better organs using independent electronic tone generation is quite acceptable for serious musical performances. It has been possible to duplicate typical pipe organ effects, such as chiff, as well as the tone decay typically experienced with organs using a so-called tracker action in which the keys are directly mechanically connected to the valves supplying air from a windchest to a pipe. Such electronic organs are relatively costly, and truly fine instruments of this type rival in cost that of fine pipe organs.

The first embodiment of the invention contemplates the provision of an electronic organ capable of producing pipe organ tones, not by electronic tone generation, but by reproducing previously recorded tone patterns obtained from a pipe organ, or other desired source. Each pitch of a desired stop or mixture recorded from the pipe organ is stored as a separate track, including at the terminal portions thereof various forms of ictus and decay, as well as a medial portion of continuous tone using the above described multiplexing retrieval technique. Upon a call from the keyboard, successive portions of the required recorded tracks are sampled, and the corresponding analog voltage samples are obtained optically. These voltages are digitized, and where several tone patterns are simultaneously called for, the corresponding digital voltages are summed and transferred to a storage register. The storage register is unloaded at real time rates, the sampled voltages being subsequently converted again to analog form for subsequent processing, amplification and replay via a suitable transducer.

With the foregoing in view, reference may now be made to the drawings, in which, in accordance with the first embodiment of the invention, the device, generally indicated by reference character 10, comprises broadly: a keyboard element 11, a stop and piston programming element 12, a main computer element 13 including a real time clock 14, a scan period clock generator 15, a laser element 16, and related laser scanner drive system 16*a*, a selectively replaceable storage record 17, acoustooptical deflecting bans 18, a signal processing amplifier 19, sampling gating means 20, pulse modulation means 21, a summng amplifier 22, an analog to digital converter 23, time conversion system means 24 including digital memories 25 and 26, a digital to analog converter 27, audio power amplifier means 28 and speakers 29.

The keyboard element 11 and stop and piston programming element 12 may resemble those of existing electronic organs, the former including one or more keyboards of the usual 44 or 61 note content, each key closing an electrical circuit signalling the main computer element. The stop and piston programming element externally resembles those of existing electronic organs, although it may be mentioned that by virtue of the selectable replacability of the storage record 17, changes in selected stops and mixtures can be also accomplished by changing the record which in effect changes the stop compliment of the instrument.

The main computer element 13 includes a control link 33 to a pair of track select memories 34 and 35, the operation of which will be more fully described hereinafter. A control link 36 interconnects with the time conversion system 24.

Figure 2:
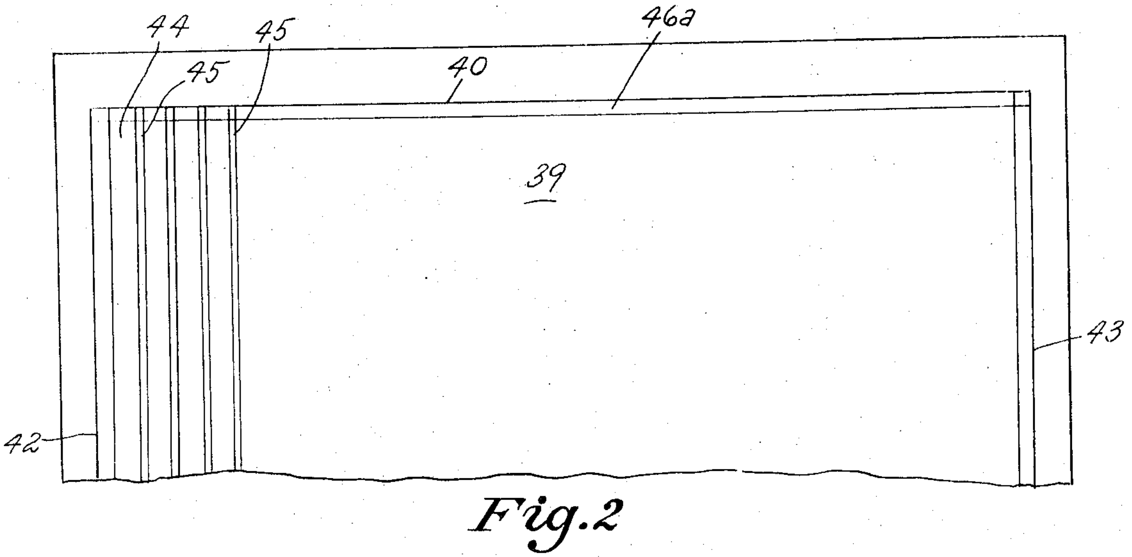
FIG. 2 is a fragmentary schematic view showing certain aspects of a finite length record forming a part of the embodiment.

A discussion of the laser 16 and its drive system 16*a* is preferably deferred to a description of the record 17. The record 17, as has been mentioned is in analog form, and is of a size which permits convenient replacement. In preferred form, it consists of one or more high resolution recording plates of glass, the operative surface of which is coated with a thin film of etchable metal, such as chromium. Plates of this general type are presently commercially available from Eastman Kodak Co. Referring to FIG. 2, a recorded area 39 is bounded by an upper edge 40, a lower edge 41, as well as left and right side edges 42 and 43, respectively. The recorded area 39 is divided into 30 vertical sectors 44 4 inches in height, and 0.200 inches in width. Each sector is separated from the adjoining sector by a sector synchronization band 45 of 0.010 inches, so that the total width of all 30 bands and sectors is 6.600 inches. A vertical start synchronization band 46*a* is 0.100 inches in height.

Extending horizontally over the 30 data sectors are 1,000 sound tracks generally indicated by reference character 47, each of total height of 100 microns, each track representing a distinct pitch and tonal quality. The 1,000 tracks will serve to record the tones of 20 ranks of pipes each with capacity of 50 notes per rank. It will be understood that other distribution may be employed if desired. These tones are pre-recorded onto a master record, and duplicates are prepared by well-known photo etching processes. It is assumed that in some cases several "attack" periods and possibly several "decay" periods are recorded on each track at each end of a steady state tone. In real time length, each track is given one second duration. The steady state tone is sustained indefinitely by the continued contiguous repetition of the steady state segment. During operation, the entire group of 30 sectors is scanned at a rate 30 times the real time rate, i.e., 33 milliseconds for each frame. The system divides time into 33 millisecond intervals, and interprets the keyboard commands as simultaneous if they are closer together than 33 milliseconds. All events are then positioned into such sublimits of time, this period being sufficiently short to avoid any subjective restrictions, and facilitates the conversion to real time playback of any possible note combinations of attach, decay or voicing. The tones once available in real time may also be tone modified by signal processing to provide a number of other "stop effects." The system is oriented, however, to provide a large range from the memory record medium alone.

It will be apparent that the 33 millisecond period is not invariable, and may be modified to suit the requirements of future needs or other real time conversion.

As will be more fully apparent hereinafter, the purpose of grouping into sectors is twofold. Firstly, since the entire record is scanned in 33 milliseconds actual time, only 33 milliseconds worth of information need be provided to the memory for the next 33 milliseconds output, and the scan will make available any information that will be required for the next 33 milliseconds output during the readout of that memory list. There are two memory shift registers 26 and 27, so that one may load while the other is read out. Secondly, since the data is digitized for each vertical scan, slice by slice through the 1,000 tracks, and through sector by sector, each slice is integrated, digitized, and that sample set considered as the sampled value of the total of events that are called forth in that slice of time. The length of memory for each register is equivalent to the total slices in one sector. However, the memory is cyclically unloaded and reloaded with each succeeding sector scan, so that any additional track segment which has been commanded will be additionally loaded as though it were recorded coincident with the previously sampled track segments. Thus, any of the sector elements may couple with any other sector elements, to provide complete musical flexibility to play any combination of tones at any time, including all notes together.

To avoid noise problems of analog light magnitude (variable area or density), present when very fast scans are employed, a pulse width modulation scheme is employed. This system permits superior signal-to-noise performance, and the very high density of data that a variable area metal-clad grainless plate provides.

Figure 3:
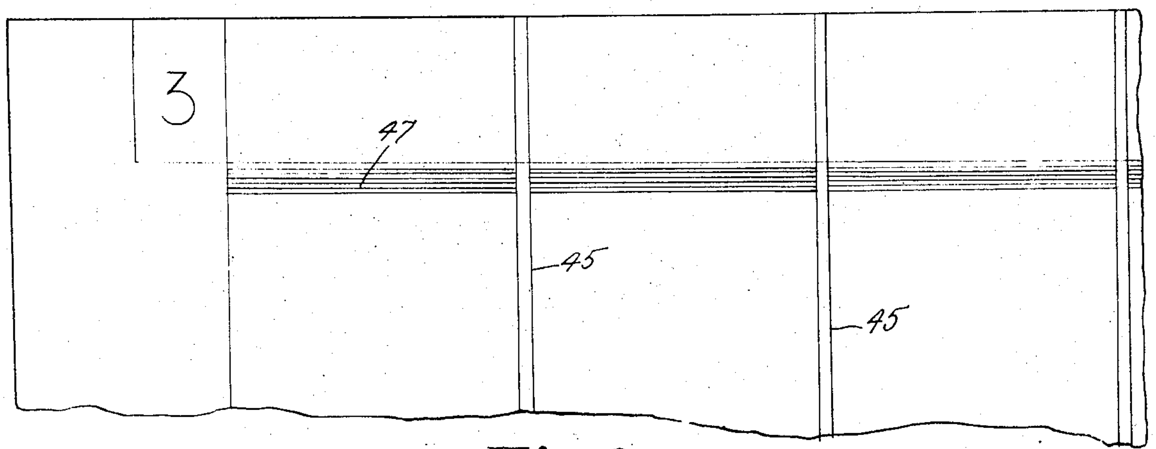
FIG. 3 is an enlarged fragmentary view corresponding to the upper left hand portion of FIG. 2.
Figure 4:
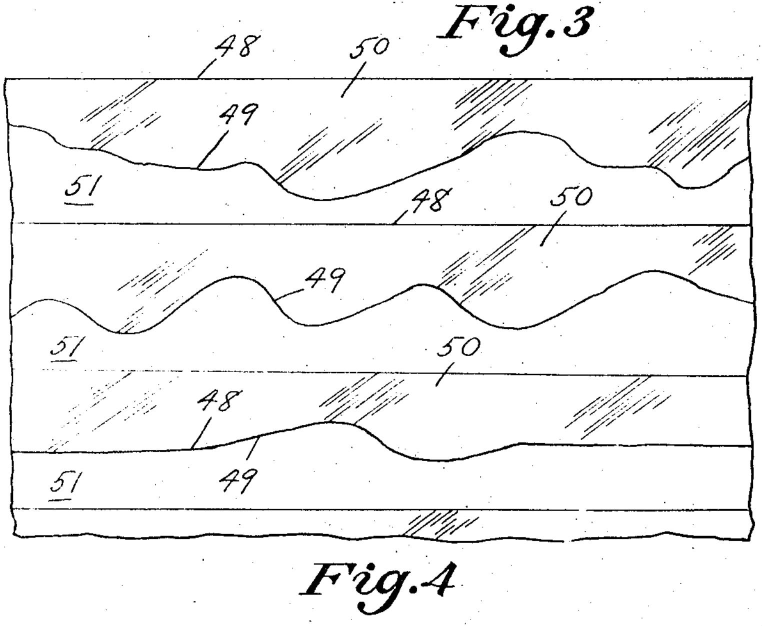
FIG. 4 is a still further enlarged fragmentary view showing three recorded tracks which form part of the finite length record.
Figure 5:
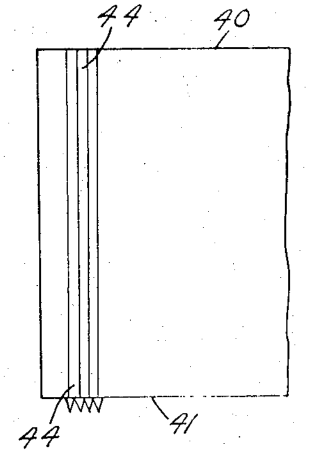
FIG. 5 is an enlarged fragmentary view showing certain other aspects of the record; e.g. scanning of the same.
Figure 6:
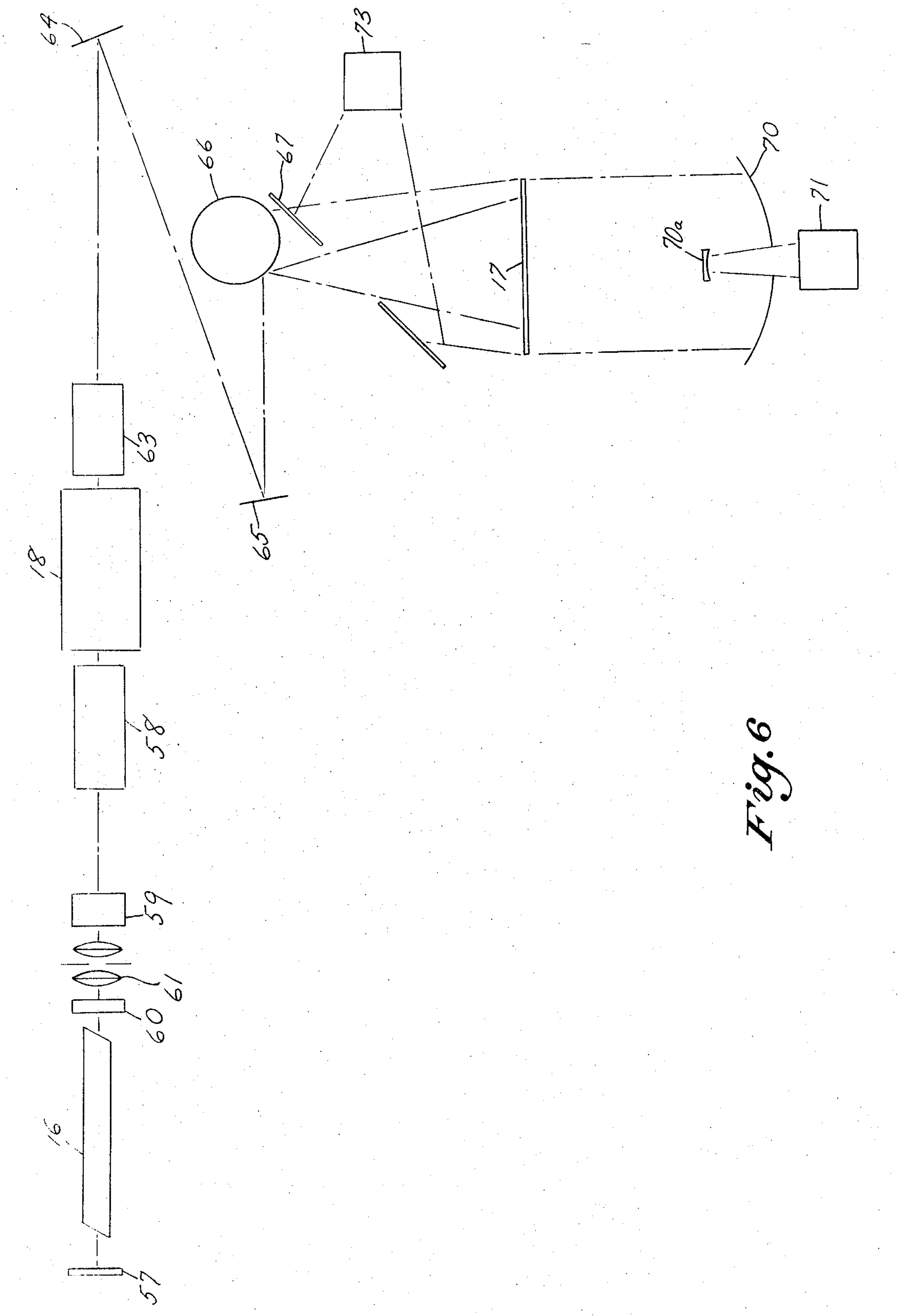
FIG. 6 is a schematic view of the laser and laser drive system forming the record scan elements of the embodiment.
Figure 9A:
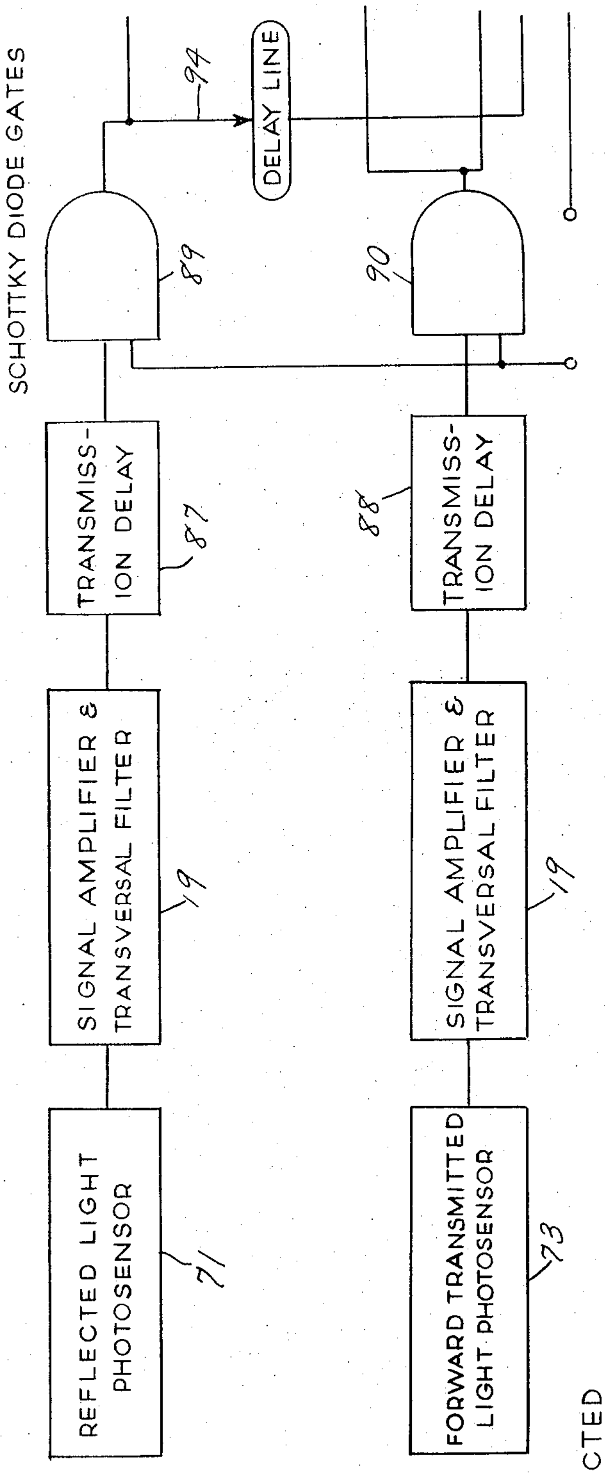
FIGS. 9*a* and 9*b* are a block diagram showing the processing of signals shown in FIG. 8.
Figure 7:
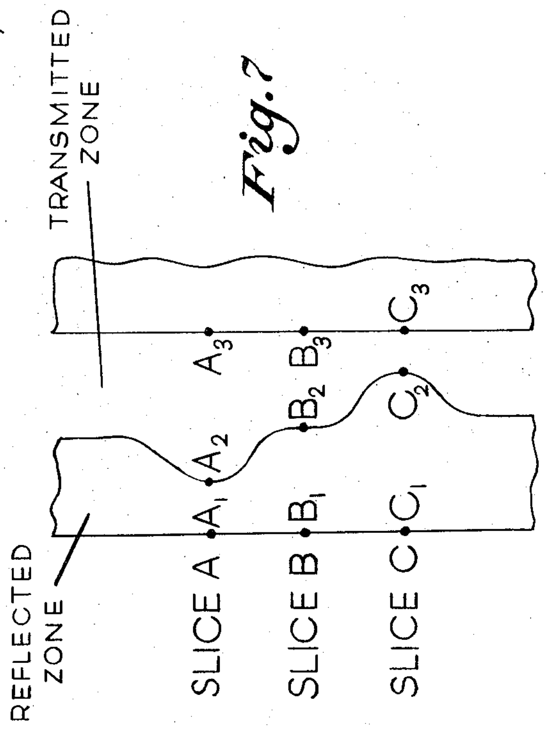
FIG. 7 is a fragmentary graphic representation of three orthogonal scans of a finite length track comprising a part of the record.
Figure 9B:
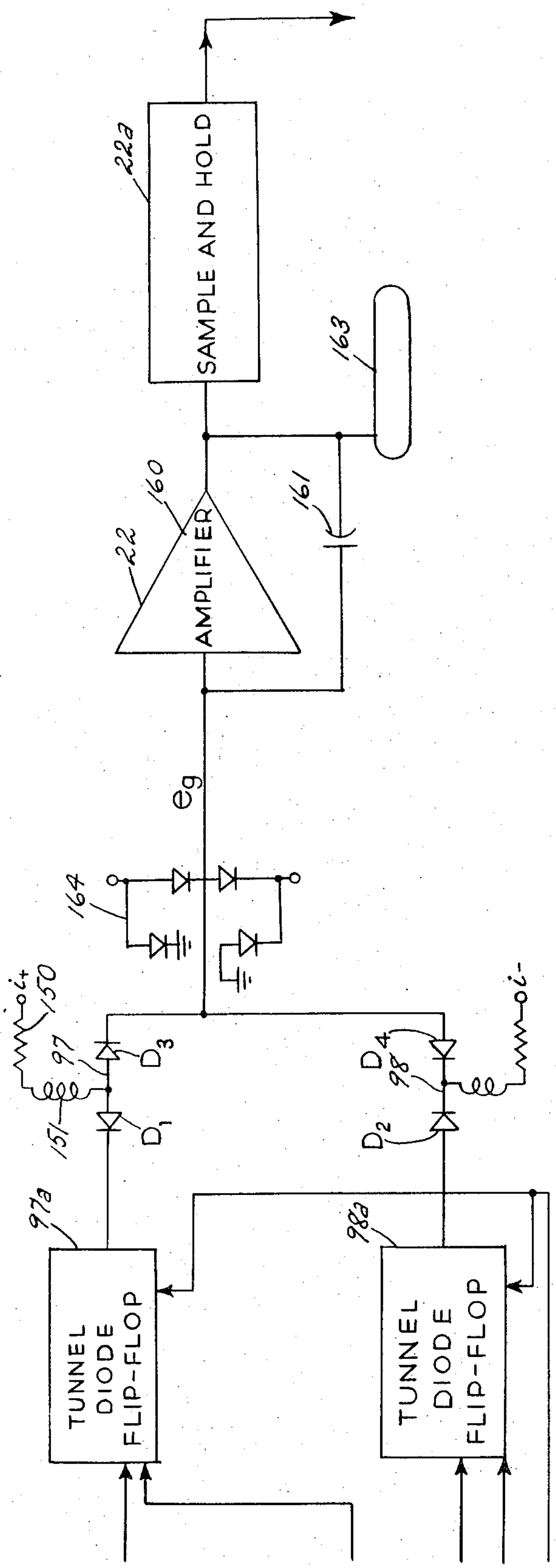

FIGS. 3 and 4 illustrate the track detail. Each track is bounded by a rectilinear upper edge 48 and a modulated lower edge 49 enclosing a reflective area 50 and an adjacent open area 51. Two photo detectors are used, one sensing the transmission of the laser beam through the plate, and the other the reflection of it from the bright metal-clad face of the plate in the areas opaque to transmission. The start of a reflection (or scatter) pulse is employed to set the pulse width modulator means 21, and the start of a transmitted light pulse is used to stop the pulse width discriminator period. The variable pulse-width is used to open and close an ultra-fast constant current gate to a fast integrator which integrates all of the samples of all the tracks that are to be used during a single slice. This pattern remains as required during one sector of 1,000 slices for the system illustrated. Thus, it is the width of metal from the rectilinear edge 48 to the variable edge 49 which carries the modulation. Since the track samples range in width from 100 picoseconds to 900 picoseconds and recur with a 1 nanosecond spacing, performing the summing of coincidence signals at this point avoids the need to further handle these very short pulses. The pulse width discriminator gates employ, for example, tunnel diodes which may be even faster than required in this design, and use a novel manner of allowing the current output to be bipolar so that each track has its zero signal level (50 percent) sensed as a zero net current to the integrator (see FIG. 7). Thus, the signals may simply be added without any variable bias effects that either a variable area or variable density system would generate when different numbers of tracks are combined. Either of such tracks are an analog transmission modulation system, and so the static transmission would vary with the number of tracks and since there is no negative light transmission, some balance or other similar scheme would be required to serve in the analog amplitude domain at these very high sampling speeds. Balancing and digital processing of very high speed pulses are both very difficult to perform. In the present construction (see FIG. 7) use is made of the relation of the timing between the backscatter pulse edge and the transmitted pulse edge to differentially operate a bipolar integration of the pulse widths.

For example, in that portion designated slice A, A1 designates the commencement of the backscatter pulse, A2 designates the commencement of the transmitted pulse, and A3 the commencement of the next backscatter pulse on an adjacent track.

The pulse corresponding to A1 starts positive current integration. A2 stops positive current integration and starts negative current integration. Negative current integration is stopped by the delayed arrival of the back-scatter pulse from A1. Thus, only the leading edges of the pulses are required to effect a biasless detection of the modulated displacement of the opaque edge. In the present construction, since the scanning speed is closely locked to the scan and a stable time base, the system operates well without severe analog demands. The low frequency noise of the laser is eliminated and the system operates with greater than **50*db*** signal-to-noise ratio at the stated conditions.

The laser 16 may be of a type known in the art. A suitable model is currently marketed by Radio Corp. of America, Camden, N.J. under No. L15429 and is of helium-neon short path coaxial 14 centimeter gas type having a doppler width of approximately 4GHz and an output of a few milliwatts. The laser drive system **16*a* includes a rear mirror 57, an ADP mode lock control 58, a spatial filter 59, and a 2cm etalon filter 60, the above system having an exit yield of greater than $2\times10^{15}$ photon/second. This yield is focused by a lens system 61 which transmits the light output to the acoustooptic deflector means 18. The system 18** may be of a $LiNbO_3$ or $PbMoO_4$ type, operating in the 1 $GH_Z$ region. Frequency modulation of the drive yields a Bragg angle modulation of over 6°.

Footnote 1: See Guidelines For The Selection Of Acoustooptic Materials, Douglas A. Pinnow, IEEE Journal Of Quantum Electronics, Vol. QE-6, No. 4, April 1970

Light emanating from the *y*-deflecting means 18 enters an exit lens system 63 to impinge upon reflecting mirrors 64 and 65. *X*-deflection is accomplished by a rotating prism system 66 which passes light through an apertured mirror 67, and the record 17. The transmitted light falls upon a second apertured mirror 70 which reflects light back to a Cassegranian mirror **70*a* and then upon the transmitted light sensor 71. Reflected light passes to the reflected light sensor 73 by the first apertured mirror 67. The electrical outputs of the sensors passes to the signal processing amplifier 19.**

Figure 8:
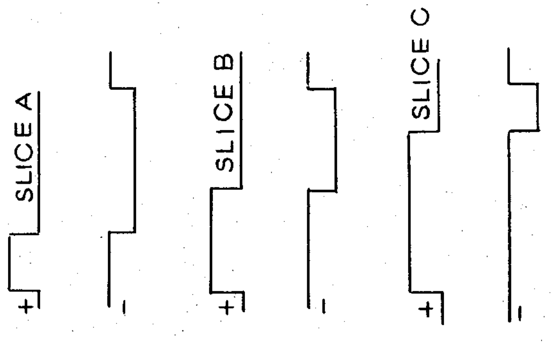
FIG. 8 is a graphic representation of the nature of signals of positive and negative character generated by the scanning operations shown in FIG. 7.

The signal processing amplifiers 19, sampling gates 20 and pulse width modulation discriminator 21 as well as the summing amplifier 22 or integrator are best understood from a consideration of FIGS. **9*a*, 9*b* and 10. The two principal signal processing functions performed are to amplify and to feed the transversal filter with the outputs of the photo sensors. These photo sensors will either be photo multiplier tubes or fast solid state diodes of light sensitive type. As is known in the art, these devices have an acceptable rise time, but a much slower fall time, and the signal amplifiers include a transversal filter to shape a narrow pulse from the rise portion of the light pulse. Typical slices of the scanning light beam are illustrated in FIG. 8,** and after shaping, the positive signal represents the metal coated reflected zone, and the negative signal the transmitted light zone. It is to be noted that a 50 percent area (i.e., no signal) produces zero output. The signals may therefore be summed without bias errors, and the integrator therefore gives the sum total algebraic value of all sampled signals in a single slice.

After signal processing, the signals are fed to delay match-adjusting devices 87 and 88, and subsequently to Schottky diode gates 89 and 90. The leading edge of the backscatter pulse as shaped into a pulse by the signal processing amplifier and transversal filter feeds through the delay-adjust and sampling gate system. The positive current gate tunnel diode flip-flop **97*a* is set by this pulse. It is reset by the transmitted light pulse which is similarly obtained. This pulse also sets the negative gate tunnel diode flip-flop 98*a*. Flip-flop 98*a* is reset by the delayed arrival of the prior backscatter pulse through delay line 94. The output of the flip-flops is used to control current gates 97 and 98 which alternately charge the integrator 22. The output of the integrator 22 is fed to the sample and hold device 22***a* which feeds the analog to digital converter 23 which is of a 12 bit type (sign plus 11 bits), the converter loading of the digital memories 26 and 27 once per slice.

Figure 11:
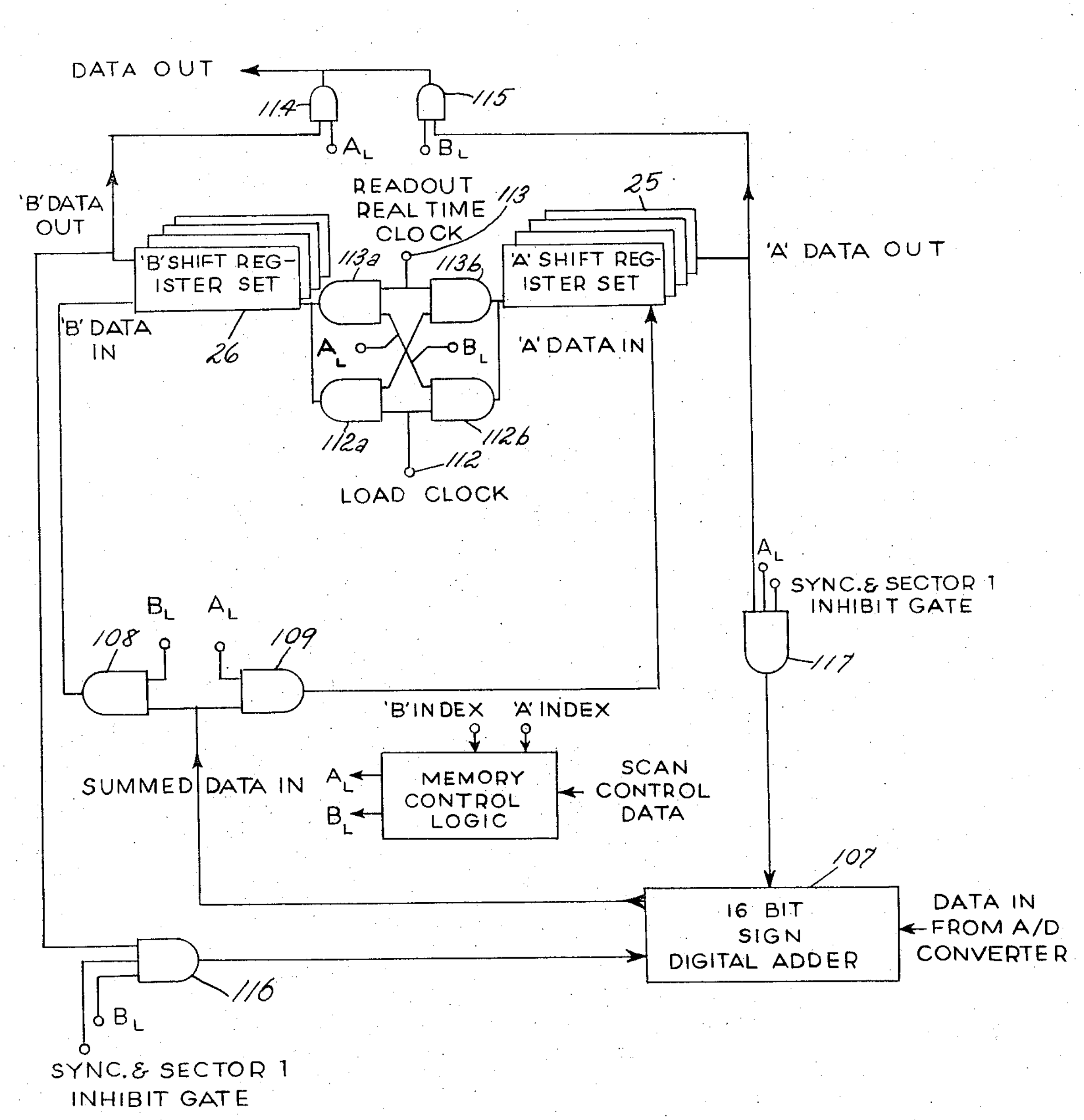
FIG. 11 is a schematic block diagram showing the loading and unloading of processed data in alternate fashion of first and second data shift registers.

Referring to FIG. 11, the time conversion system 24 is illustrated in greater detail. The function of this structure is to enable digital information to alternately flow into one or another of the two memories, so that one may be loaded, while the other is unloaded to create a continuous flow of digital information. Each set of shift registers is loaded with data from the analog to digital converter which passes through a 16 bit plus sign digital adder. This adder permits the addition of later selected track segments to be added to the segments previously sampled without loss or disturbance of data. The memory shift register set thus is unloading the just previously loaded sector data during each subsequent sector scan. The adder accomplishes the simple addition of later selected data permitting the coincident reproduction of data from any sectors. After 30 such loading cycles, the shift register set is transferred during the synchronizing interval from load operation at sampling rate to unload operation at real time clock rate by the gates 108-109, load clock gates 112-*a* and 112*b* and readout clock gates 113*a* and 113*b*. Each of the 18 parallel registers in both A and B sets are 1,001 bits long. The load clock is synchronized to the fast scan at a 1 nanosecond rate. Unloading is 30 times slower and is controlled by a readout clock 113 operating at real time, i.e., a 33 microsecond rate. Thus, all data which has accumulated during the 33 millisecond period during which the register was loaded, is simultaneously available at readout time. The unload gates 114 and 115 are also controlled by memory control logic which also controls the sync and section 1 inhibit gates with 116 and 117, which control the digital adder 107. The shift register sets each have one register that has a one bit index value to mark the start of the 1,000 bit cycle. This index register acts as a cycle counter. The memories are cleared by the adder during the first sector operation because of the presence of the sector 1 inhibit pulse which effectively adds only zero to the new input data.

Figure 12:
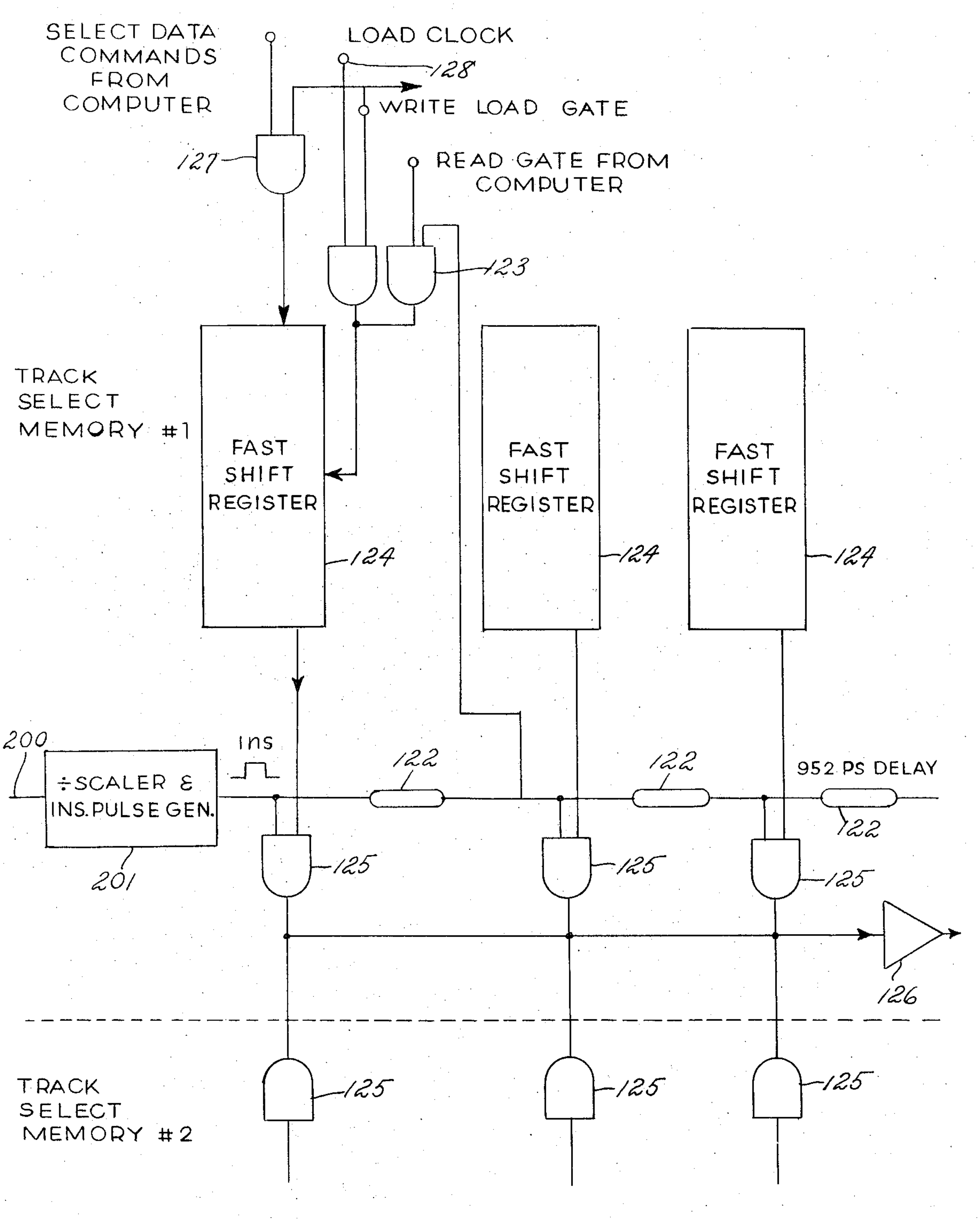
FIG. 12 is a block diagram showing for the track selection memory the operation of shift registers.

Referring to FIG. 12, the track-select system 30 which controls the sampling gate means 20 is illustrated in greater detail. The track-select memories are duals, one reading out to drive the sampling gates at speeded up scan rate of 952 picoseconds per track, while the other loads the 1,000 track select bits during the 1.05 milliseconds scan time of the current sector. The track-select data requires revision only once per sector. The load time is therefore a relatively simple matter for computer control. The fast gate information is derived from ten slower registers by a delay line driven by ORing fast AND gates to drive the sampling pulse amplifier. FIG. 12 illustrates one of two identical track-select memories, both of which receive a 952 picosecond clock gated out sync pulse, generally indicated by reference character 200. This pulse feeds a divide by 10 scaler and 1 nonosecond pulse generator 201. The output of 1 nanosecond pulses is successively delayed at each fast shift register readout gate 125 by a 952 picosecond delay member 122, so that each fast shift register 124 is gated out in succession. The delay elements accomplish two functions. The first above described function appropriately delays the readout of the slower than desirable fast shift registers 124. This permits memory control of the fast sampling operation to select tracks. The slower memories are started in shift mode by the next delayed 1 nanosecond pulse via gate 123. The ORed fast current mode AND gates 125 receive pulses from the registers and gate them to an amplifier 126 to operate the sampling gating means 20. Data-in gate 127 is controlled from the computer 13, and a shift clock 128 is connected in parallel with the read gate 123 for entry of data from computer control during the relatively long 1 millisecond interval required for a sector scan, by the write in gate.

Referring again to FIG. 1, the output of the digital to analog converter 27 passes to the audio power amplifier 28 which will normally include a volume control operated by the swell pedal of the organ. The speakers 29 may be of conventional type, including rotary driven types commonly used in the electronic organ art.

To recapitulate, each track contains a real time length of 990 milliseconds. There are 30 cycles of complete scan of the record medium for a complete readout of the entire track length. Each of the 30 cycles requires 33 milliseconds actual time.

During a single pulse width modulation scan, each single track is scanned for 952 picoseconds, and each vertical scan or slice is 1,000 microseconds. Thus each of the 30 sectors is sliced 1,000 times in the 1.00 millisecond scan time for that sector. Sectors are separated by a sync period of 0.05 milliseconds equal to 50 slices. Thirty sectors make up one complete records, with 750 microsecond start sync and 750 microsecond stop sync added to the 31.5 millisecond scan time to make a total of 33 milliseconds for the total record. Thus, 30 of these speeded up scans of the total record are able to provide readout of the contents of one full track length in 990 milliseconds.

A single slice scan time equals 1 microsecond, and 1,000 such slices are completed as the beam transverses a single sector. All pulse width modulation current pulses from selected tracks are being integrated during each single slice, and the integrated value from the previous slice is simultaneously being digitized by the 12 bit analog to digital convertor and stored in the data memory sector then in the load mode. During each sector scan, one of the two track-select memories is read to gate the desired tracks, and the other is loaded with the select data for the next sector to be scanned. The first sector selection is loading during both long 750 microsecond sync periods.

During this period, signal memory A (digital 1,000 bits) may be reading out in real time while the other memory (section B) is being loaded by the then active scan of the data record. Note that each sector of 1,000 bits additively reloads into the memory the selected tracks so that the readout of the memory can contain elements of sectors from any portion of the data record. This permits the selection of desired ictus and tone decay which may be contained in the first two or three sectors and the last two or three sectors.

Figure 10:
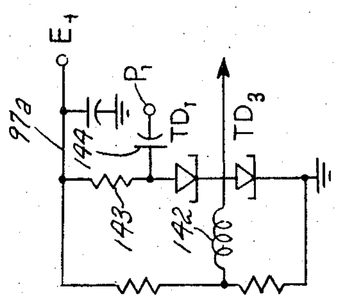
FIG. 10 is a schematic diagram of a tunnel diode flip-flop forming a part of the embodiment.

The operation of the tunnel diodes 97*a* and 98*a* can be understood by the drawing in FIG. 10. Tunnel diodes TD-1 and TD-3 are of Gallium-arsenide type in order to provide sufficient switching voltage to operate current gate 97. Resistor 143 is chosen such that with potential $e+$ applied to the combination of tunnel diode and inductors 140 and 141 only one of the two diodes is turned on and the current flowing is below the peak value for switching of the tunnel diodes. Inducter 142 and resistor 143 are chosen to permit the application of a trigger pulse at point P1 through capacitor 144. This trigger pulse causes the peak current in the unswitched diode to exceed its trigger point and hence switches it into the onstate thus extinguishing the operation of the on diode from its forward potential. The operation of this circuit is well known in the art.

The tunnel diode flip-flop is designed for the purpose of operating current gate 97 and in a complementary manner current gate 98. Gate 97 is composed of resistor 150 and inductor 151 together with Shottke diodes D1 and D3. Current gate 97 operates by sending current from $i+$ through either diode D1 or D3 depending upon the potential of the cathode of D1. If D1's potential on the cathode exceeds that of eg., the summing junction of the integrator, then all the current is shunted into D3 and thereby into the integrator. When D1's cathode is more than 3/10 of a volt below the potential on eg, diode D3 is effectively backbiased and all the current is shunted through diode D1 to be sunk in the output of tunnel diode flip-flop 97*a* in TD-3. It should be noted that the current $i+$ is not altered by the effect of the switching action. Thus it is that the current fed to the integrator is determined by the set value of $i+$ and the width of the onswitched condition of tunnel diode TD-3. The negative polarity of summing junction current is introduced to the integrator in like fashion by means of tunnel diode flip-flop 98*a* and current gate 98. Both of these are arranged with the polarities of anode and cathode inverted and operate in corresponding manner to provide a switching function for the negative current. Integrator 160 consists of amplifier and capacitor 161 the combination designed to maintain potential eg., always at ground and to represent by its output potential the magnitude of current introduced into the summing junction. This integrator operates during one slice to integrate the total value of all switched current pulses during that slice and is reset to zero by the action of an output clamp circuit 163 and an input clamp circuit 164 composed of four diodes. Clamp 164 operates with a positive current pulse to provide a higher current reset of the capacitor and amplifier to zero. It is of a well known type and need not further be described here. The integrator 22 consists of an amplifier 160 and a feedback capacitor 161 designed to maintain potential eg., always at ground. This integrator operates during one slice to integrate all the current width pulses to it, from the tunnel diode flip-flops 97*a* and 98*a*. It is reset to ground after the sample hold circuit has determined the final value of integrated current pulses by means of a clamp circuit on the output 163 and an input clamp circuit composed of four diodes. The input clamp circuit 164 controls the four diodes. Clamp circuit 164 is of a well known type designed to operate upon positive current flow in which the diodes force discharge of capacitor and resetting potential to ground. It need not be described further in detail here.

We wish it to be understood that we do not consider the invention limited to the precise details of structure shown and set forth in this specification, for obvious modifications will occur to those skilled in the art to which the invention pertains.

We claim:

1. Data storage and retrieval means comprising: a generally rectangularly shaped, at least partially transparent record, a plurality of opaque elongated tracks disposed in juxtaposed parallel relation upon one surface of said plate, and defining open areas therebetween, a laser scanner and laser scanner drive means causing said laser scanner to perform a scan orthogonally of the principal axes of said track means to produce a sampling of said record means for selecting a desired subset of the total sample set, first light sensor means receiving light from said laser reflected by opaque portions of said tracks, and second light sensor means receiving light transmitted through said open areas thereof, signal processing means for converting reflected light to a signal of first polarity, and transmitted light to a signal of opposite polarity, and means summing said signals in terms of algebraic value.

2. Structure in accordance with claim 1, in which said sampling selector means is interposed between the light sensor means and the processing signal means, including sampling gates receiving the output of said signal processing means, pulse width modulation means receiving the output of said sampling gates, resettable summing means receiving the output of said pulse width modulation means, analog to digital converter means receiving the output of said pulse width modulation means, a plurality of digital memories selectively loaded by said analog to digital converter, a digital to analog converter receiving the readout of said digital memories in selective fashion, and transducer means receiving the output of said digital to analog convertor.

* * * * *